United States Patent [19]

Errede et al.

[11] 4,128,513
[45] Dec. 5, 1978

[54] SORBENT FOAM MATERIAL

[75] Inventors: Louis A. Errede, North Oaks; Robert A. Sinclair, St. Paul, both of Minn.

[73] Assignee: Minnesota Mining and Manufacturing Company, St. Paul, Minn.

[21] Appl. No.: 469,102

[22] Filed: May 13, 1974

[30] Foreign Application Priority Data

May 25, 1973 [GB] United Kingdom ............... 25181/73

[51] Int. Cl.² .......................... C08J 9/16; C08G 73/00
[52] U.S. Cl. ........................................ 521/50; 55/389;
55/74; 210/502; 521/77; 521/180; 521/183;
521/189; 252/421
[58] Field of Search ............ 260/2.5 D, 2.5 M, 2.5 R, 260/2 R

[56] References Cited

U.S. PATENT DOCUMENTS

| 2,268,419 | 12/1941 | Paul | 260/2 R |
|---|---|---|---|
| 3,475,374 | 10/1969 | Marvel et al. | 260/2 R |
| 3,484,387 | 12/1969 | Jackson et al. | 260/2 R |
| 3,563,917 | 2/1971 | Marvel | 260/2 R |
| 3,576,769 | 4/1971 | Hirsch et al. | 260/2.5 D |
| 3,778,336 | 12/1973 | Adams | 260/2.5 R |

OTHER PUBLICATIONS

Poshkus et al., *Journal of Applied Polymer Science*, vol. 14, pp. 2049–2064 (1970), John Wiley and Sons, Inc.

*Primary Examiner*—Wilbert J. Briggs, Sr.
*Attorney, Agent, or Firm*—Cruzan Alexander; Donald M. Sell; Mark A. Litman

[57] ABSTRACT

A black sorbent thermoset foam which has been prepared by the pyrolysis of a composition comprising at least one aromatic nitrogen-containing compound having the general formula:

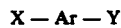

in which Ar represents an aromatic nucleus on which X and Y are substituents directly attached to the nucleus, X represents a substituent having a negative Hammett sigma constant and attached to the aromatic nucleus by a nitrogen, oxygen or sulphur atom, and Y represents a substituent having a positive Hammett sigma constant and attached to the aromatic nucleus by a nitrogen atom, the substituents X and/or Y optionally forming part of a ring fused onto the aromatic nucleus, in an effective sorbtive substance for polar molecules and materials.

10 Claims, No Drawings

SORBENT FOAM MATERIAL

This invention relates to sorbent materials and in particular materials which will sorb a wide variety of gases and vapors, and to the use of these materials in the sorption of various molecules and in particular polar molecules.

A widely used adsorbent material is activated charcoal. This can be given a very large adsorbing surface area so that relatively large quantities of gases and vapors can be physically adsorbed. The physical adsorption involves quite loose bonding and so the charcoal can be regenerated by heating to drive off the adsorbed molecules. Active charcoal is not a very good adsorbent for polar molecules and so, to adsorb polar molecules from an environment such as a gas stream, it is necessary to use large amounts of activated charcoal to ensure complete adsorption of the polar molecules.

It is, therefore, an object of this invention to provide a sorbent material which is capable of sorbing relatively large quantities of polar molecules very strongly.

According to one aspect of the invention, there is provided a black, sorbent, thermoset foam which has been prepared by the pyrolysis of a liquid composition comprising at least one aromatic nitrogen-containing compound having the general formula:

in which Ar represents an aromatic nucleus on which X and Y are substituents directly attached to the aromatic nucleus and which optionally carries additional substituents, X represents a substituent having a negative Hammett sigma constant and attached to the aromatic nucleus by a nitrogen, oxygen or sulphur atom and Y represents a substituent having a positive Hammett sigma constant and attached to the aromatic nucleus by a nitrogen atom, the substituents X and/or Y optionally forming part of a ring fused onto the aromatic nucleus, the thermoset foam having a specific surface area of at least 50 $m^2/g$.

It is generally preferred in the aromatic nitrogen-containing starting materials to have no more than about 50 carbon atoms per set of X and Y groups (including any carbon atoms in X and Y). More preferably there are no more than about 30 carbon atoms per set of X and Y and most preferably no more than 15 carbon atoms.

Such a thermoset foam has very good chemisorption properties and so is an excellent sorbent material for polar molecules such as, for example, organic acids and bases, organic halogen compounds, the halogens such as chlorine, bromine and iodine, strong acids such as HCl, other acids such as HF, $H_2S$ and HCN, heavy metal ions such as $Hg^{2+}$, $AG^+$, and $Pb^{2+}$ from liquids, oxides of nitrogen such as NO and oxides of sulphur such as $SO_2$ and $SO_3$. Such polar molecules appear to form a chemical bond with the sorbent material and so are very strongly held as compared with the loose physical adsorption of activated charcoal. In addition, the thermoset foams of the invention retain a large porportion of their sorptive capacity even when hot.

The thermoset foam of the invention is a good sorbent for most gases and vapors and it can have physical adsorption properties approaching those of activated charcoal. In most cases, however, activated charcoal has better physical adsorption properties for neutral organic molecules such as hexane, benzene and ethyl acetate and, therefore, it is sometimes useful to use a mixture of the thermoset foam of the invention and activated charcoal so as to obtain excellent chemisorption of polar molecules and excellent physical adsorption of other molecules.

The aromatic nitrogen-containing compound is pyrolysed by heating it to a relatively low temperature, e.g. around 200° to 230° C., but once pyrolysis starts, an exothermic reaction occurs and it appears that the temperature of the overall mass may increase to a temperature of the order of 300° C. Within this mass there may, however, be localized regions where the temperature is much higher. Once the exothermic reaction starts, no further external heating is required, the heating to pyrolysis temperature being merely to initiate the reaction.

When reaction occurs, there is a quite sudden and large expansion to give a sponge of the thermoset foam which may have an apparent volume many hundreds of times the initial volume. Therefore, unless careful steps are taken to ensure that the pyrolysis temperature is maintained or the thermoset foam is purified, the foam will contain unreacted material and low molecular weight condensed fusible species which are carcinogenic or otherwise toxic to humans if the foam is handled.

Several alternative or supplemental methods are available for purifying or ensuring the purity of the thermoset foam product. These methods may be used separately or in combination, and act to remove extraneous materials and unreacted material from the sorbent foam.

The most effective way of assuring a pure product is to drive to completion the reaction in which the foam is formed. This can most readily be done by maintaining the foam at its reaction temperature even after the heat released from the exothermic reaction becomes insufficient to maintain that elevated temperature. In this fashion, one may watch the reaction temperature, and when the temperature begins to fall, sufficient heat should be added to maintain that temperature for an additional 20 minutes to 3 hours. If the foam product has cooled after formation, it can be reheated in an inert atmosphere to accomplish the same result. This type of process also tends to increase the specific surface area of the foam.

The foam material may also be extracted to remove harmful materials. For example, the foam may be powdered and washed successively with an acid (e.g., dilute HCl) or base (e.g., dilute NaOH) and an organic solvent (e.g., acetone). Between each washing, the powder can be recovered by filtration and washed with water. This will help remove all traces of starting materials and low molecular weight species.

The foam-forming process can also be run at high pressure (superatmospheric pressures up to 150 atmospheres and more) which keeps the product compressed (without significantly reducing the potential for high specific surface area of the foam). The compression acts to ensure complete heating of the products and completion of the reaction.

Therefore, according to another aspect of the invention, there is provided a black sorbent thermoset foam which has been prepared by the pyrolysis of a liquid composition comprising at least one aromatic nitrogen-containing compound, having the general formula:

in which Ar represents an aromatic nucleus on which X and Y are substituents directly attached to the aromatic nucleus and which optionally carries additional substituents, X represents a substituent having a negative Hammett sigma constant and attached to the aromatic nucleus by a nitrogen, oxygen or sulphur atom, and Y represents a substituent having a positive Hammett sigma constant and attached to the aromatic nucleus by a nitrogen atom, the substituents X and/or Y optionally forming part of a ring fixed onto the aromatic nucleus, the thermoset foam being non-carcinogenic or otherwise toxic to humans and substantially free from low molecular weight fusible toxic components and so capable of being safely handled by man. The fusible materials referred to are low molecular weight, partially fused starting materials.

Such a thermoset foam does not therefore contain anything but traces of starting material or low molecular weight fusible species, e.g., no more than 0.001% by weight of either, and even residual traces such as these are usually occluded within the body of the foam and therefore precluded from contact when the foam is handled.

In order to ensure that the thermoset foam be non-carcinogenic or otherwise non-toxic it can be prepared in the pure state if substantially complete pyrolysis is ensured by enclosing the material during reaction so that, in spite of the sudden and large increase in apparent volume, substantially all of the reacting material is maintained at the pyrolysis temperature after formation, or by exhaustively purifying it as prepared with e.g., by washing with dilute acids, water, dilute bases, water and organic solvents. The advantage of washing with the organic solvent last is that this seems to assist in displacing water from the foam and if volatile it can then be left to evaporate off. If required, one can both exhaustively purify and reheat the thermoset foam to at least its pyrolysis temperature.

The black thermoset foams of the invention are prepared by pyrolysis of a liquid composition that is liquid at the pyrolysis temperature, to give the solid foam and not be charring of a carbonaceous solid to give a solid char. Thus, the pore structure of the foams of the invention becomes formed during the pyrolysis reaction and is not already present in the material being pyrolysed. In effect, a condensation reaction appears to occur during the pyrolysis which can be catalysed by the presence of a strong acid or strong base. Therefore, the aromatic nitrogen-containing compound should have a structure which readily condenses, or the liquid mixture which is pyrolysed should contain in addition to the aromatic nitrogen-containing compound one or more compounds which promote the condensation of the aromatic nitrogen-containing compound, e.g., because they are dehydrating agents for and/or co-condense with, the aromatic nitrogen-containing compound.

There are a large number of ways in which liquid compositions containing the aromatic nitrogen-containing compound can be pyrolysed. Thus, an aromatic nitrogen-containing compound which is liquid at the pyrolysis temperature, can be pyrolysed on its own or in admixture with other components to give a liquid mixture at the pyrolysis temperature, i.e., a mixture which is composed of liquid components, or a solution of one or more components. In order to give effective pyrolysis the volatility of the components at the pyrolysis temperature should not be too high. Thus, if the components are gaseous at the pyrolysis temperature, they will evaporate off from the liquid composition. These other components are, as noted above, chosen to promote the condensation of the aromatic nitrogen-containing compound. One group of compounds which promote this condensation are believed to be dehydrating agents for the aromatic nitrogen-containing compound, examples of which are strong mineral or organic acids and strong bases. Another group of compounds are those which will co-condense with the aromatic nitrogen-containing compound and assist in forming cross-links in the foam structure. It is believed that this tends to define the desired pore structure in the thermoset foams of the invention at an early stage in the pyrolysis of the aromatic nitrogen-containing compound. Examples of this latter group include organic acids.

Examples of suitable strong acids are mineral acids such as sulphuric acid and phosphoric acid or organic acids such as methane sulphonic acid or fluorinated methane sulphonic acid, while examples of strong bases are the mineral bases, such as sodium and potassium hydroxide. One can, of course, employ latent acids, i.e., compounds which readily decompose on heating to the pyrolysis temperature and yield strong acids. Examples are amine salts of strong acids such as $(CH_3)_3NSO_3$, and $CH_3CBr_3$.

The aromatic nitrogen-containing compound can also be pyrolysed in admixture with an organic acid such as oxalic acid or adipic acid which appear to co-condense with the aromatic nitrogen-containing compound and may, in some instances, give foams of increased specific surface area. When they are used, however, it appears to be particularly desirable to include a strong acid in the liquid mixture which is pyrolysed.

The aromatic nitrogen-containing compound can further be pyrolysed in admixture with a soluble salt, preferably in the additional presence of a strong acid or base. Examples of suitable soluble salts are sodium sulphate, sodium chloride, sodium bisulphate and primary sodium phosphate. It is believed that these soluble salts act rather like a filler forming layers or pores between condensed reacted molecules during the pyrolysis to assist in defining the structures required in a molecular scale. Thereafter, removal of these salts, e.g., by leaching, leaves the required pore structure.

The resulting specific surface area depends upon the particular aromatic nitrogen-containing compound or mixture of that compound and other components chosen, but the specific surface area can be increased by further pyrolysis, e.g., at temperatures of 300° to 800° C., of the thermoset foam under a controlled atmosphere, e.g., a nitrogen atmosphere which may be saturated with steam. During this further pyrolysis, weight loss occurs and specific surface area increases.

The larger the surface area, the larger the quantity of material which can be sorbed. Thus, the pure non-carcinogenic and non-toxic thermoset foam preferably has a specific surface area of at least 50 $m^2/g$ and desirably the specific surface area of the foams of the invention are at least 200 $m^2/g$ and can be as high as 900 $m^2/g$, or with preferred materials even higher.

The large and sudden increase in volume which occurs upon pyrolysis to give the thermoset foam, occurs as a result of the release of steam and other volatile materials during the reaction. The resulting material is comparable to a sponge having large voids. These do not contribute significantly to the specific surface area, which is a measure of the microporous structure of the foam. This specific surface area can be measured by standard BET methods as described by Brunauer, Emmett and Teller in the Journal of the American Chemical Society, 60, page 309 (1938). We believe that it is in the pores of this microporous thermoset foam that polar molecules are chemically sorbed and so the higher the specific surface area, the larger the sorptive capacity of the foam.

As noted above, the aromatic nitrogen-containing compound is one having the general formula:
X — Ar — Y in which X, Ar and Y are as defined above.
The compound contains at least one nitrogen atom. A nitrogen atom forms part of the substituent Y, but the compound can contain one or more additional nitrogen atoms, e.g., as part of the substituent X or as part of the aromatic nucleus.

The Hammett sigma values of a substituent is a measure of the oxidizing or reducing properties of that group. For a disucssion of the values and their measurement reference is made for example to "Advanced Organic Chemistry: Reaction Mechanisms and Structure" by J. March-McGraw-Hill, page 238 and Chem. Rev. 53 191 (1953) — Jaffé.

The substituent X which has a negative Hammett sigma value is a substituent which has a reducing action. Examples of suitable substituents X are:
— $NH_2$,
— OH,
— SH,
— NHR where R represents an alkyl group, an aryl group, e.g., a phenyl group, or an alkenyl group, e.g., a vinyl group,
— $NRR^1$ where R is as above and $R^1$ represents the same or a different alkyl group, aryl group or alkenyl group,
— NH — $NH_2$
— NH — $NHR^2$ where $R^2$ represents an alkyl group,
— NH — $NR^2R^3$ where $R^2$ is as above and $R^3$ represents the same or different alkyl group,
— NH $R^4$ where $R^4$ represents a repeating moiety, e.g., —CH—$CH_2$— in a polymeric compound or the atoms required to complete a divalent link which completes a ring fused to the aromatic nucleus Ar, e.g., —NH—CH = CH—,

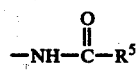

where $R^5$ represents an alkyl group, an —$NH_2$ group, an alkenyl group, e.g., vinyl, or the grouping $R^4$; and
— N = CH — A where A represents an aromatic group such as a phenyl group which is optionally substituted.

With the exception of the groups —SH and —OH, we believe that many, if not all, of the above groups may be precursors for the group —$NH_2$ and that these groups initially decompose to an amine group before or during the pyrolysis reaction. The size or weight of the groups pendant on the attaching nitrogen, oxygen, and sulphur atoms of the X and Y groups is not critical as it is believed that these groups are expelled during pyrolysis and do not significantly effect the reaction path. Some of the X and Y groups may even be completely expelled. For purposes of economy, however, it is desirable to limit the size of alkyl groups to 1 to 8 carbon atoms, and the aryl group to about 20 carbon atoms, although alkyl groups of up to 20 carbon atoms and aryl group having up to 40 carbon atoms are not unreasonable in the practice of this invention (although requiring more substantial efforts at purification).

The substituent Y which has a positive Hammett sigma value is a substituent which has an oxidizing action. Examples of suitable substitutents Y are:
$NO_2$
NO
— N = N—, and

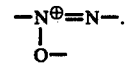

The last two substituents are known to impart carcinogenic properties and so if they are present on a compound to be pyrolysed, the compound must be handled very carefully and the resulting foams carefully purified. The purification techniques useful in the practice of this invention are discussed elsewhere herein.

The substituent X and Y may each form part of a ring which is fused onto the aromatic nucleus represented by Ar. In such a case, however, the nitrogen-containing compound must, of course, contain two rings, one of which forms the aromatic nucleus Ar and the other of which the substituent X or Y. Thus, for example, in the case of the compound 5-nitroindoline, the nitro group is the substituent Y, the benzene ring the nucleus Ar and the divalent link —NH—CH = CH— fused to the benzene ring the substituent X.

The preferred substituents for X are an amino and a hydroxy group and the preferred substituent Y is a nitro group.

The positions of the substituent on the aromatic nucleus are not critical. But preferably, when X represents an amino or hydroxy group and Y represents a nitro group, the amino or hydroxy group is in the ortho or para position relative to the nitro group.

The aromatic nucleus represented by Ar contains at least one aromatic ring. It can, however, contain more than one aromatic ring, e.g., 2, 3 or more, and these rings can be fixed to one another or be linked by a conjugate linking group. The simplest aromatic nucleus is a benzene ring but other aromatic nuclei containing 5 and 6 membered carbon or heterocyclic rings such as the following examples of two ring nuclei:

Naphthalene, and
indoline

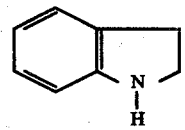

and the following examples of three ring nuclei:

anthracene, and
fluorene

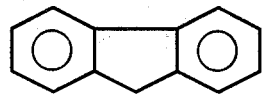

are useful when appropriately substituted with X and Y.

The aromatic nucleus can contain substituents other than X and Y such as, for example, lower alkyl groups, e.g., methyl and octyl, halogen atoms, e.g., chlorine, and carboxylic groups. In addition, there may be more than one X and/or Y substituent on the aromatic nucleus. Any such additional substituents to X and Y should be chosen so as not to affect the pyrolysis reaction which is thought to be a type of Wohl-Aue reaction. Groups which are both non-labile under the reaction conditions and which block condensation of the nitrogen-containing aromatic compounds during pyrolysis are undesirable. Thus, in the case of the pyrolysis of nitroaniline the condensation reaction can be schematically represented as follows:

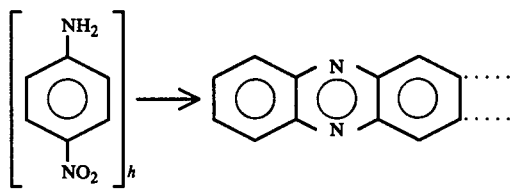

Examples of aromatic nitrogen-containing compounds which we have found can be pyrolysed on their own or in admixture to give foams according to the invention are:

m - nitroacetanilide,
p - nitroacetanilide,
2 - nitroaniline,
4 - nitroaniline,
amino - nitro - toluenes,
amino - nitro- xylene,
2, 6 - dibromo - 4 - nitroaniline,
2, 6 - dichloro - 4 -nitroaniline,
4 -nitrophenylhydrazine,
bis - (2 - nitrophenyl urea),
nitronaphthyl amines having vacant positions ortho to nitro - and amino groups such as 5 - nitro -1- naphthylamine
5 - nitroindoline,
2 - chloro - 4 - nitroaniline,
2 - methyl - 4 - nitroaniline,
5 - amino - 2 - nitrobenzoic acid,
2 - amino - 4 - nitrophenol,
3 - methyl - 4 - nitrophenol,
2 - amino - 7 - nitrofluorene,
4 - nitrosophenol,
4 - nitrophenol,
4 - methylaminonitrobenzene,
4 - dimethylaminonitrobenzene
nitrated coal tar residues containing multi-ring compounds, the polymeric compound

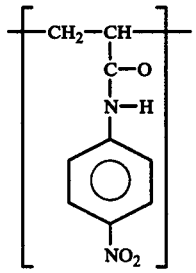

2-amino-5 -nitropyridine,
the compound

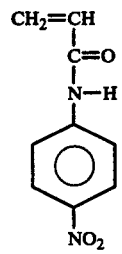

The compound

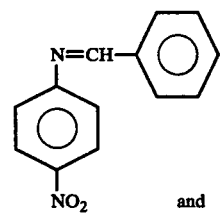

and the compound

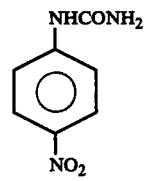

The thermoset foams of the invention are believed to have a polyquinoxaline structure and so it appears that they contain the general repeating structure:

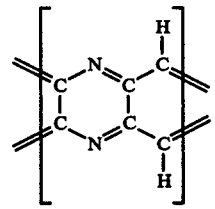

with crosslinking between the chains of these repeating fused aromatic rings, the positions of the crosslinks being from the carbon atoms to which the hydrogen atoms are attached after removal of the latter. This structure makes the thermoset foam very stable both to heat and oxidation. Thus, a piece of the foam can be held in a flame and while it will glow and gradually burn away, it will stop burning immediately after it is removed from the flame and is not apparently decomposed by this treatment. This structure is consistent with the black color of the foam and with the elementary analysis of the foam which gives a nitrogen content in the range of about 12 to 20%.

In this foam structure it appears that the nitrogen atoms impart the chemisorption properties. It therefore appears that the larger the percentage nitrogen content of the foam the better are its chemisorption properties. Preferably therefore, the substituent X is one which is linked by a nitrogen atom to the aromatic nucleus. In addition to this, the foam may, depending upon its manner of preparation, contain some functional groups. Thus, when the pyrolysis is effected in the presence of sulphuric acid or phosphoric acid there may be some sulphonate or phosphate groups in place of some of the hydrogen atoms. Many of the functional groups tend to be removed by post-pyrolysis treatment.

Although one or more aromatic nitrogen-containing compounds can be pyrolysed on their own, it is preferred that a mixture of one or more aromatic nitrogen-containing compounds and an acid such as sulphuric acid or phosphoric acid or a mixture of an organic acid such as oxalic acid with a mineral acid, or a mixture of a strong acid and an excess of a salt such as sodium sulphate, or a strong base such as sodium hydroxide or potassium hydroxide, by pyrolysed. Such a mixture is usually a pasty liquid at room temperatures and as this is slowly brought up to the pyrolysis temperature, usually in the range of about 200° to 230° C., a homogeneous solution forms. Then a vigorous reaction suddenly occurs with copious evolution of gases, believed to be mainly steam, and a voluminous black sponge of the thermoset foam is formed.

This manner of preparation often tends to give thermoset foams which have, as prepared, relatively low specific surface areas, e.g., when pyrolysis is effected in the presence of sulphuric acid, but which can be given increased specific surface areas by, for example, further pyrolysis as noted above. When the pyrolysis is effected in the presence of phosphoric acid, the foams can have quite high specific surface areas, provided the molar ratio of acid to aromatic compound is in the range 1.7 to 3.0. When this ratio is lower than 1.7 voluminous sponges tend to be given by the pyrolysis which, however, have low specific surface areas.

Once the voluminous black sponge has been formed it can be crushed to give a powder of the thermoset foam. This destroys the large voids in the sponge but retains the specific surface area which is constituted by the microporous structure of the foam. The foam powder can then be used or alternatively treated (e.g., by post-pyrolysis and/or exhaustive extraction) to purify it from carcinogenic materials or other toxic components or simply to increase its specific surface area.

To purify the thermoset foam, it can be powdered and the powder washed successively with an acid, e.g., dilute HCl, or base, e.g., dilute NaOH, and an organic solvent such as acetone. Between each washing, the powder can be recovered by filtration and washed with water. In this way, all traces of starting materials and low molecular weight fusible species can be removed. Alternatively or in addition, the thermoset foam powder can be further pyrolysed under higher temperatures, e.g., 400° C., and an inert atmosphere, e.g., a nitrogen atmosphere. This also tends to increase the specific surface area of the foam.

Once the powder has been prepared and optionally purified or pyrolysed, it can be pelletized to bring it into a form suitable for handling and use as a sorbent. There are, however, many other ways in which it can be made into a readily handleable form, e.g., by mixing it with a binding agent such as cellulose or peat or incorporating it into a fabric such as a felt type fabric of, for example, cellulose.

As noted above, the thermoset foam can sorb very strongly relatively large amounts of, in particular, polar molecules. When one wishes to remove the polar molecules from a fluid containing them, the thermoset foam is placed in contact with the fluid. In the case where the fluid is a gas, the gas can be passed over or through a bed of the thermoset foam, which may be in the form of a powder, pellets or incorporated in a fabric as noted above, while when the fluid is a liquid the foam in a suitable physical form can be placed in contact with the liquid.

The thermoset foams are very useful in removing noxious or poisonous gases from the air. Thus, they are very useful as active sorbing materials in face masks or filters for air streams from chemical processes or cooking or in air conditioning, either alone or in combination with other known sorbing materials. For example, when the thermoset foam is used in face masks, it is highly effective in removing poisonous gases such as HCN or HF which may be present near electrochemical plating processes. $H_2S$, and $SO_2$ may be present in waste gases from combustion processes and so the thermoset foams are very useful in removing these sulphur compounds and preventing their release into the atmosphere. A further use of the thermoset foams is in cooker hoods for removing unpleasant cooking odors from kitchens. In any of these uses the thermoset foam may be admixed with activated charcoal which tends to have a high sorptive capacity for those molecules for which the foam of the invention has a relatively low sorptive capacity.

The thermoset foams of the invention can also be used to remove unwanted molecules, particularly polar molecules such as heavy metal ions from liquids such as water. One such use is in drying water-wet hydrocarbons such as petroleum or chlorohydrocarbons such as trichloroethylene which is used in dry-cleaning. The foams may also remove other unwanted molecules from such dry-cleaning liquids to clean them for re-use. A further use is to improve the flavor of potable water, thereby making it palatable to drink.

The thermoset foams of the invention also have uses as molecular sieves. For example, the foams can be used in place of zeolite under acid conditions in the petroleum industry since zeolite tends to be decomposed by these acid conditions, whereas the foams of the invention are not. By control of the manufacture and purification or post-pyrolysis of the foams of the invention, one can achieve the required micropore size for use as a molecular sieve for a particular application.

The invention will now be illustrated by the following examples in which all parts are by weight unless otherwise indicated.

EXAMPLE 1

Concentrated sulphuric acid (5 parts) was added slowly with stirring to 4 parts of 4-nitroaniline to produce a semi-solid paste. The mixture was heated slowly to 210° C. to produce a homogeneous solution. A vigorous reaction occurred thereafter with copious gaseous evolution to give a voluminous black sponge, which represented an expansion in bulk of several hundredfold its original volume in the liquid state.

The product sponge was then macerated in dilute aqueous HCl for about half an hour and recollected by filtration. The filter cake was washed consecutively in water, dilute sodium hydroxide, water, and acetone, by redispersing in the liquid extract and recollecting by filtration. These steps were necessary to ensure removal of all traces of unreacted starting material and low molecular weight fusible condensation products.

The resulting granules were then dried in a vacuum oven overnight at 150° C. and baked at 400° C. under nitrogen to ensure complete pyrolytic conversion of any occluded reactants or intermediates to the desired thermoset foam, which was then physiologically inert.

The amount of material isolated represented 76% of the combined feed stock. Elementary analysis for C, H, N and S was consistent with the empirical formula:

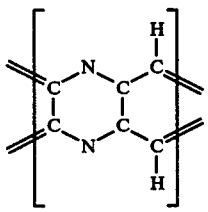

having some sulphonic groups distributed randomly, the number of which decreased with the duration of heat treatment at 400° C.

The specific surface area of this material after grinding to 100 mesh was measured by the BET method set out above using nitrogen at −196° C. and found to be less than 2 square meters per gram.

EXAMPLE 2

A 4-nitroanilinium sulphate paste prepared as in Example 1 from 5 parts sulphuric acid and 4 parts 4-nitroaniline was reacted at 210° C. as described in Example 1 to give the voluminous black sponge. This sponge was then packed into a cylindrical furnace and heat treated for an additional 6 hours at 250° C. under nitrogen to ensure total reaction of starting materials and removal of excess sulphuric acid by dissociation and volatilization. A small amount of ammonium sulphate, sulphur and a trace of 4-nitroanilinium sulphate was isolated in the distillate.

Elimination of water accounted for most of the weight loss which occured during post-pyrolysis. The specific surface area was measured and found to be about 5 m$^2$/g.

EXAMPLE 3

The example demonstrates the effect of a further pyrolysis of the relatively low porosity black thermoset foam.

A quantity of the black thermoset foam prepared as in Example 1 and Example 2 was placed in a furnace maintained at elevated temperature as summarized in Table I below. A nitrogen stream saturated with water at 20° C. was metered to the foam at the rate of 300 cc/min. Pyrolysis was continued for one hour. The foam was then removed and the specific surface area was measured by BET method using nitrogen. Pyrolysis treatments were carried out at 300° C., 700° C. and 800° C. The specific surface area was found to increase with the temperature of pyrolysis and the loss in weight also increased with temperature as summarized in Table I below:

Table I

| Pyrolysis Temperature (° C) | Weight Loss % | Specific Surface Area (m$^2$/g) |
| --- | --- | --- |
| Before treatment | 0 | 2 |
| 300 | 24 | 270 |
| 700 | 53 | 350 |

Table I-continued

| Pyrolysis Temperature (° C) | Weight Loss % | Specific Surface Area (m$^2$/g) |
| --- | --- | --- |
| 800 | 66 | 450 |

EXAMPLE 4

One part of sodium sulphate was pulverized and mixed with 3 parts of concentrated sulphuric acid and then admixed with 2 parts of 4-nitroaniline. The mixture was heated to 180° C. with stirring to produce a homogeneous solution. The temperature was raised slowly to 210° C. whereupon a vigorous reaction occured to produce the highly expanded thermoset black sponge. This sponge was macerated in water and recollected by filtration. The filter cake was washed continuously with fresh water until the filtrate was free of sulphate ions as indicated by the barium chloride test. The product was dried at 80° C. overnight in a vacuum oven and then weighed. The material isolated represented 70% of theoretical based on a polyquinoxaline structure. The specific surface area was measured and found to be 7 m$^2$/g using the BET method. It appears, therefore, that the addition of a soluble salt of the acid to the initial mixture gives a foam with increased specific surface area.

EXAMPLE 5

Three parts of orthophosphoric acid were mixed with two parts of 4-nitroaniline and heated to 180° C. to produce a uniform solution. The temperature was increased slowly to 210° C. whereupon a vigorous reaction occurred to produce a voluminous black sponge which was purified as described in Example 1. The surface area was measured and found to be 670 m$^2$/g.

The procedure of this example was repeated with various molar ratios of orthophosphoric acid to 4-nitroaniline and the resulting specific surface areas (measured by nitrogen uptake at −196° C.) and methylene blue uptake (determined by a standard procedure as described in H. W. Hassler, Activated Carbon, Chemical Publishing Co., Inc., 1963) were measured and listed in the following Table II:

Table II

| Molar ratios H$_3$PO$_4$/nitroaniline | Specific surface area (m$^2$g$^{-1}$) | Methylene blue uptake (mg g$^{-1}$) |
| --- | --- | --- |
| 0.41 | <10 | 12.2 |
| 0.83 | <10 | 0 |
| 1.67 | 181 | 3.0 |
| 2.09 | 180 | 139.1 |
| 2.30 | 570 | 187.8 |
| 2.52 | 965 | 90.9 |
| *2.96 | 625 | 95.1 |
| 2.96 | 550 | 42.0 |
| 3.35 | <10 | 23.3 |
| 5.10 | <10 | 11.9 |

*In this case the reactants were rapidly heated to pyrolysis temperatures.

As can be seen, the resulting specific surface area and methylene blue uptake depend upon the relative proportions of acid and nitroaniline and reached an optimum at molar ratios of between 1.6 and 3.0.

EXAMPLE 6

Seven parts of polyphosphoric acid was mixed with three parts of 4-nitroaniline to give a viscous mixture which became homogeneous when the temperature was raised to 180° C. The temperature of the solution was raised slowly to about 210° C. whereupon a vigorous reaction occurred producing the black sponge which was treated as described above. The surface area was found to be 300 m²/g.

As can be seen from Examples 5 and 6, the use of a phosphoric acid in place of the sulphuric acid appears to give a thermoset foam with an increased specific surface area provided the molar ratio of acid to aromatic compound is in the range 1.6 to 3.0.

EXAMPLE 7

Five parts of sulphuric acid were mixed with four parts of m-nitroacetanilide and the mixture was heated to 210° C. to produce a voluminous black sponge. The product was treated as described in Example 1. The purified black thermoset foam had a specific surface area of 188 m²/g.

EXAMPLE 8

This example demonstrates the sorption and retentivity of gases by the thermoset foam of the invention.

The sorption behavior of the foams prepared according to the invention was evaluated by first degassing small samples under high vacuum conditions and then monitoring uptake of a particular gas with increasing pressure, using apparatus as described by Gregg and Sing (Adsorption Surface Area and Porosity, p. 308, Academic Press, 1967). Retentivity values were determined by first saturating the sorbent with sorbate and then pumping off again to constant weight loss at $10^{-5}$ torr pressure. The specific surface area of the foam was measured by standard BET methods as described above.

The results for particular gases are set out in the following Table III:

Table III

| Gas sorbed | Specific Surface Area ($M^2g^{-1}$) | Uptake at 23° C (moles $g^{-1}$/pmmHg). | Retentivity at 23° C (weight %). |
|---|---|---|---|
| HCl | 450 | 3.8/405 | |
| HCl | 600 | 10.8/410 | 4.5 |
| SO₂ | 450 | 3.0/380 | |
| SO₂ | 600 | 9.6/750 | 1.0 |
| HCN | 5 | 5.8/373 | 5.6 |
| HCN | 554 | 9.4/14 | 20.7 |
| HCN | 610 | 14.8/380 | 38.0 |
| H₂S | 450 | 4.1/380 | 5.0 |
| H₂S | 600 | 5.0/380 | 6.2 |
| HF | 600 | 234/760 | 20.0 |
| Cl₂ | 5 | 1.3/532 | 16.1 |
| Cl₂ | 600 | 7.4/532 | 41.3 |

By way of comparison, the specific surface area and retentivity of the two types of commercially available activated carbon were measured for various gases and the results are given hereafter. One type of carbon was in granular form. All adsorption measurements were effected by passing the substantially pure gases shown in the following Table IV over the active carbon:

Table IV

| Gas sorbed | Specific surface area ($m^2g^{-1}$) | Retentivity at 23° C (weight %) |
|---|---|---|
| HCL | 765 | 0.5 |
| SO₂ | 1100 (granular) | 1.1 |
| HCN | 1100 (granular) | 0.54 |
| H₂S | 1100 (granular) | 0.4 |
| Cl₂ | 765 | 6.4 |

As can be seen, the thermoset foams of the invention tended to have a much higher retentivity of sorbed polar gases. Also as shown by the results by Table IV, the foams of the invention have a retentivity which increases with specific surface area.

EXAMPLES 9 to 18

Following the procedure of Example 1, the aromatic nitrogen-containing compounds shown in the following Table V were pyrolysed with sulphuric acid in the molar ratio of aromatic compound to sulphuric acid of 1:2. It was found that the initial temperature at which pyrolysis occurred varied slightly from compound to compound but was within the range of 200° to 230° C.

The specific surface areas and methylene blue and iodine uptakes of the resulting black thermoset foams were measured and are shown in the following Table V. The specific surface areas were measured by the BET method using nitrogen as given in Example 1. The methylene blue and iodine uptakes were measured by finding the weight of each of these sorbed by the foams.

Table V

| Example No. | Aromatic compound | Surface area ($m^2g^{-1}$) | Methylene blue uptake (mg/g) | Iodine uptake (mg/g) |
|---|---|---|---|---|
| 9 | 5-nitroindoline | 5 | 152 | 1171 |
| 10 | 5-nitro-1-naphthylamine | 2.5 | 0 | 545 |
| 11 | 2-chloro-4-nitroaniline | 1000 | 24 | 389 |
| 12 | 2-methyl-4-nitroaniline | 30 | 37 | 420 |
| 13 | 5-amino-2-nitrobenzoic acid | 160 | 46 | 342 |
| 14 | 2-amino-4-nitrophenol | 15 | 43 | 370 |
| 15 | 3-methyl-4-nitrophenol | 5 | 34 | 356 |
| 16 | 2-amino-7-nitrofluorene | 96 | — | — |
| 17 | 4-nitrosophenol | 57 | — | — |
| 18 | 4-nitrothiophenol | 22.5 | — | — |

As can be seen for particular foams having a high surface area, they do not necessarily have a large methylene blue or iodine uptake. It appears that these three values of surfaces area as measured using nitrogen, and the methylene blue and iodine uptakes gave an indication of the pore size distribution in the foam. Thus, nitrogen is the smallest molecule, iodine is the medium sized molecule and methylene blue the largest molecule of the three. Thus, the values in Table V give an indication of the relative pore sizes and distribution of pore sizes in the various foams.

EXAMPLES 19 to 24

The procedure of Example 5 was repeated except that a number of different aromatic nitrogen-containing compounds as listed in the following Table VI were pyrolysed in a weight for weight ratio of 1:1 with phosphoric acid except for Example 24 where the ratio was 1:2. The specific surface areas measured by nitrogen uptake, and the methylene blue and iodine uptakes of the resulting foams were measured and are listed in the following Table VI.

Table VI

| Example No. | Aromatic compound | Surface area ($m^2g^{-1}$) | Methylene blue uptake (mg/g) | Iodine uptake (mg/g) |
|---|---|---|---|---|
| 19 | 2-chloro-4-nitroaniline | 91 | — | — |
| 20 | 2-amino-4-nitrophenol | 92 | 23 | 370 |
| 21 | 5-nitroindoline | 44 | 23 | 354 |
| 22 | 5-amino-2-nitrobenzoic acid | 219 | 112 | 579 |
| 23 | 2-amino-7-nitrofluorene | 31 | — | — |
| 24 | 4-nitrosophenol | 75 | — | — |

EXAMPLE 25

The procedure of Example 4 was repeated using 1 part of oxalic acid, 1 part of sulphuric acid and 1 part of 4-nitroaniline. The resulting black foam was found to have a specific surface area of 280 $m^2g^{-1}$.

EXAMPLE 26

One part of 4-nitroaniline and 2 parts of sodium hydroxide were mixed together and heated in the manner described in Example 1 to give a voluminous black sponge. This was treated in the manner described in Example 1 and the specific surface area of the product was measured as described in Example 1 and found to be 69.2 $m^2g^{-1}$.

EXAMPLE 27

Example 26 was repeated except that potassium hydroxide was substituted for the sodium hydroxide. The resulting foam was found to have a specific surface area of 163.5 $m^2g^{-1}$.

The toxicity of purified foams according to the invention was checked to see that the post pyrolysis and exhaustive purification gave a foam which was non-carcinogenic or otherwise toxic to man.

In investigating the toxicity of these foam materials, it was found that the acute oral $hD_{50}$ (rat) was greater than 5000 milligrams per kilogram of body weight which classifies that material as being at least "practically non-toxic" as defined in Gleason, Cosselin and Hedge "Clinical Toxicology of Commercial Products, 1957", or "non-toxic" as defined by the United States Federal Hazardous Substances Labelling Act. Also, it was found that no deaths were produced, no pharmacotoxic signs were observed at any time during the study period, and no gross pathology was observed at necropsy.

The foam was also found to be non-irritating occularly and dermally in albino rabbits under the study conditions utilized. No signs of eye or skin irritation were observed in any of the test animals at any time during the study period. The acute oral toxicity was determined as follows:

Method: Adult albino male and female rats of the Spragse-Dawley strain, weighing 150 to 250 grams were fasted for 24 hours, then given a single calculated dose and placed in screen bottom cages with free access to water and laboratory chew for a two-week observation period.

Administration:
Method: Fed in feed jars
Concentration of foam and diluent
25% in laboratory chew
Sample Preparation:
Results:

| Dosage level of foam [1] (g/kg) | Mortality | |
|---|---|---|
| | No. [2] | Day [3] |
| 5 | 0/10 | |

[1] Of (foam under test)
[2] Number dead/number dosed
[3] Period during which deaths were observed
Estimated ORAL LD 50: In excess of 5 mg/kg

| Animal Number | Sex | In Weight | Final Weight | Observations at Necropsy |
|---|---|---|---|---|
| 1 | M | 162 | 230 | NRA* |
| 2 | M | 172 | 247 | NRA |
| 3 | M | 180 | 232 | NRA |
| 4 | M | 176 | 246 | NRA |
| 5 | M | 161 | 218 | NRA |
| 6 | F | 160 | 200 | NRA |
| 7 | F | 158 | 202 | NRA |
| 8 | F | 162 | 211 | NRA |
| 9 | F | 157 | 206 | NRA |
| 10 | F | 156 | 200 | NRA |

*No remarkable alterations
No pharmacotoxic symptoms were noted.

The skin irritation was determined as follows:

Method: Albino rabbits were used for this work. They were housed in individual screen-bottom cages and fed water and rabbit chew ad libitum. The hair was clipped from the back and flanks of the animal. The test material was applied to two areas on each of six rabbits. One abraded area, and 1 intact area, in the amount of 0.5 ml per area in the case of liquids or 0.5 gm per area in the case of solids. The treated areas were covered with gauze path and tape to maintain the test material in contact with the skin and decrease the rate of evaporation. The animals were fitted with collars for a 24-hour period at which time the coverings were removed, and the degree of erythema and edema were recorded according to the scale following. A second reading was taken at 72 hours. The average of the 24 and 72-hour readings was used to determine the primary irritation score for the sample.

Application:
Concentration of test material: As submitted
Diluent or solvant: None
Results:

| Animal Number | 24 hours | | 72 hours | | Average |
|---|---|---|---|---|---|
| | Abraded | Unabraded | Abraded | Unabraded | |
| 1 | | | | | |
| 2 | | | | | |
| 3 | No irritation - all readings negative | | | | |
| 4 | | | | | |
| 5 | | | | | |
| 6 | | | | | |

Primary skin irritation score: 0

Scale for Evaluations of Skin Reaction

| Erythema and Eschar Formation | Score | Edema Formation | Score |
|---|---|---|---|
| Slight erythema | 1 | Slight edema - (barely perceptible) | 1 |
| Defined erythema | 2 | Defined edema (edges definite rising) | 2 |
| Moderate to severe erythema | 3 | Moderate edema (area raising 1 mm) | 3 |
| Severe erythema to slight eschar formation | 4 | Severe edema (raised more than 1 mm) | 4 |

Score equals sum of erythema and edema readings. Skin irritation index equals average of 24 and 72-hour scores.

The eye irritation was tested as follows:

Method: Adult albino rabbits of the New Zealand White variety were placed in a collar such that the animals could not rub their eyes. One-tenth of a milliliter (0.1 gm for solids) of test substance was instilled in one eye, the other untreated eye served as a control. A series of six albino rabbits was used for each substance. The reaction to the test material was read according to the scale of scoring for damage to the cornea, iris, and bulbar and palpebral conjuctivae at 24, 48 and 72 hours after eye instillation. Any residue of the test material and accumulated discharge are flushed from the eye each time they are scored.

| | | Cornea | | | Conjunctive | | |
|---|---|---|---|---|---|---|---|
| | Rabbit Number | Opacity | Area | Iris | Redness | Chemosis | Discharge |
| 24 hours | 1 2 3 4 5 6 | | No irritation - all readings negative | | | | |
| | | 24-hour eye irritation score: 0 | | | | | |
| 48 hours | 1 2 3 4 5 6 | | No irritation - all readings negative | | | | |
| | | 48-hour eye irritation score: 0 | | | | | |
| 72 hours | 1 2 3 4 5 6 | | No irritation - all readings negative | | | | |
| | | 72-hour eye irritation score: 0 | | | | | |

Administration:
Concentration of test sample used: As Submitted
Diluent or solvent: None
Special washing: None
Result:*

*No irritation was noted at one-hour post-instillation.

What we claim is:

1. A black sorbent thermoset foam which has been prepared by the pyrolysis of a composition liquid at the pyrolysis temperature comprising sulfuric acid and at least one aromatic nitrogen-containing compound having the general formula:

$$X - Ar - Y$$

in which Ar represents an aromatic nucleus, X represents a substituent having a negative Hammett sigma constant and attached by a nitrogen, oxygen or sulphur atom, and Y represents a substituent having a positive Hammett sigma constant and attached by a nitrogen atom, the substituents X and/or Y forming part of a ring fused onto the aromatic nucleus or attached directly to the aromatic nucleus, the thermoset foam having a specific surface area of at least 50 m²/g, and said pyrolysis comprising heating said composition to a temperature below 300° C. to initiate reaction of the said composition.

2. A thermoset foam as claimed in claim 1 which has a specific surface area of at least 200 m²/g.

3. A black sorbent thermoset foam which has been prepared by the pyrolysis of a composition liquid at the pyrolysis temperature comprising at least one aromatic nitrogen-containing compound having the general formula:

$$X - Ar - Y$$

in which Ar represents an aromatic nucleus, X represents a substituent having a negative Hammett sigma constant and attached by a nitrogen, oxygen or sulphur atom, and Y represents a substituent having a positive Hammett sigma constant and attached by a nitrogen atom, the substituents X and/or Y forming part of a ring fused onto the aromatic nucleus or attached directly to the aromatic nucleus, the thermoset foam having a specific surface area of at least 50 m²/g, and said pyrolysis comprising heating to a pyrolysis temperature of below 300° C. to initiate reaction a composition which is liquid at the pyrolysis temperature and which comprises at least one aromatic nitrogen-containing compound having the general formula:

$$X - Ar - Y$$

in which Ar represents an aromatic nucleus, X represents a substituent having a negative Hammett sigma constant and attached by a nitrogen, oxygen or sulphur atom, and, Y represents a substituent having a positive Hammett sigma constant and attached by a nitrogen atom, the substituents X and/or Y forming part of a ring fused onto the aromatic nucleus or attached directly to the aromatic nucleus and then subjecting the foam to further pyrolysis at a higher temperature to increase its surface area.

4. A foam as claimed in claim 3 in which the strong acid is phosphoric acid and the molar ratio of acid to aromatic compound or compounds is from 1.6 to 3.0.

5. A foam as claimed in claim 3 in which the strong base is sodium or potassium hydroxide.

6. The foam of claim 3 wherein the product is purified by the application of heat to the foam after the exothermic reaction of formation slows to further drive the reaction of formation towards completion.

7. The foam of claim 3 wherein the pyrolysis is run at higher then atmospheric pressure.

8. A foam as claimed in claim 3 in which the at least one said aromatic nitrogen-containing compounds is a nitroaniline.

9. A black sorbent thermoset foam which has been prepared by the pyrolysis of a composition liquid at the pyrolysis temperature comprising at least one aromatic nitrogen-containing compound having the general formula:

$$X - Ar - Y$$

in which Ar represents an aromatic nucleus, X represents a substituent having a negative Hammett sigma constant and attached by a nitrogen, oxygen or sulphur atom, and Y represents a substituent having a positive Hammett sigma constant and attached by a nitrogen atom, the substituents X and/or Y forming part of a ring fused onto the aromatic nucleus or attached directly to the aromatic nucleus in which the composition further comprises a mixture of at least one said aromatic nitrogen-containing compound and a soluble salt, the method further comprising leaching of the salt from the foam formed by the pyrolysis.

10. A black sorbent thermoset foam which has been prepared by the pyrolysis of a composition liquid at the pyrolysis temperature comprising at least one aromatic nitrogen-containing compound having the general formula:

$$X - Ar - Y$$

in which Ar represents an aromatic nucleus, X represents a substituent having a negative Hammett sigma constant and attached by a nitrogen, oxygen or sulphur atom, and Y represents a substituent having a positive Hammett sigma constant and attached by a nitrogen atom, the substituents X and/or Y forming part of a ring fused onto the aromatic nucleus or attached directly to the aromatic nucleus, the thermoset foam having a specific surface area of at least 50 m²/g, and said pyrolysis comprising heating to a pyrolysis temperature of below 300° C. to initiate reaction a composition which is liquid at the pyrolysis temperature and which comprises at least one aromatic nitrogen-containing compound having the general formula:

$$X - Ar - Y$$

in which Ar represents an aromatic nucleus, X represents a substituent having a negative Hammett sigma constant and attached by a nitrogen, oxygen or sulphur atom, and, Y represents a substituent having a positive Hammett sigma constant and attached by a nitrogen atom, the substituents X and/or Y forming part of a ring fused onto the aromatic nucleus or attached directly to the aromatic nucleus and then subjecting the foam to further pyrolysis at a higher temperature under inert atmosphere to increase its surface area.

* * * * *